United States Patent [19]
Elmore et al.

[11] 4,081,802
[45] Mar. 28, 1978

[54] RADAR AND NAVIGATION CHART OVERLAY VIDEO DISPLAY SYSTEM

[75] Inventors: Richard E. Elmore, Port Orchard; Richard L. Plumb, Bremerton, both of Wash.

[73] Assignee: The United States of America as represented by the Secretary of the Navy, Washington, D.C.

[21] Appl. No.: 757,183

[22] Filed: Jan. 6, 1977

[51] Int. Cl.² ............................................. G01S 7/24
[52] U.S. Cl. .............................. 343/5 ST; 343/6 TV
[58] Field of Search ........................... 343/5 ST, 6 TV

[56] References Cited

U.S. PATENT DOCUMENTS

| 2,930,844 | 3/1960 | Donnay | 343/6 TV X |
| 3,085,241 | 4/1963 | Moore | 343/5 ST |
| 3,298,022 | 1/1967 | Smith | 343/6 TV |
| 3,307,177 | 2/1967 | Novak | 343/6 TV X |

FOREIGN PATENT DOCUMENTS

| 968,125 | 8/1964 | United Kingdom | 343/5 ST |

*Primary Examiner*—T.H. Tubbesing
*Attorney, Agent, or Firm*—R. S. Sciascia; Charles D. B. Curry

[57] ABSTRACT

A display system for simultaneously showing slewed radar and navigation chart information on a real time basis. A slewed radar signal from a ship mounted radar is processed to maintain the terrain as a fixed display and the moving ship, upon which the radar is mounted, as a moving display. A video TV signal is also generated that represents a navigation chart that corresponds to the slewed radar signal. The TV signal representing the processed slewed radar signal is mixed with the navigation chart TV signal and both are simultaneously presented on a TV display. The navigation chart TV signal is adjusted so that the terrain is matched to and is coincident with the terrain of the processed slewed radar signal. The TV display, therefore, presents both slewed radar information and navigation chart information wherein the navigation chart information is fixed on the TV display and all radar presented information that moves with respect to the terrain moves on the TV display.

8 Claims, 8 Drawing Figures

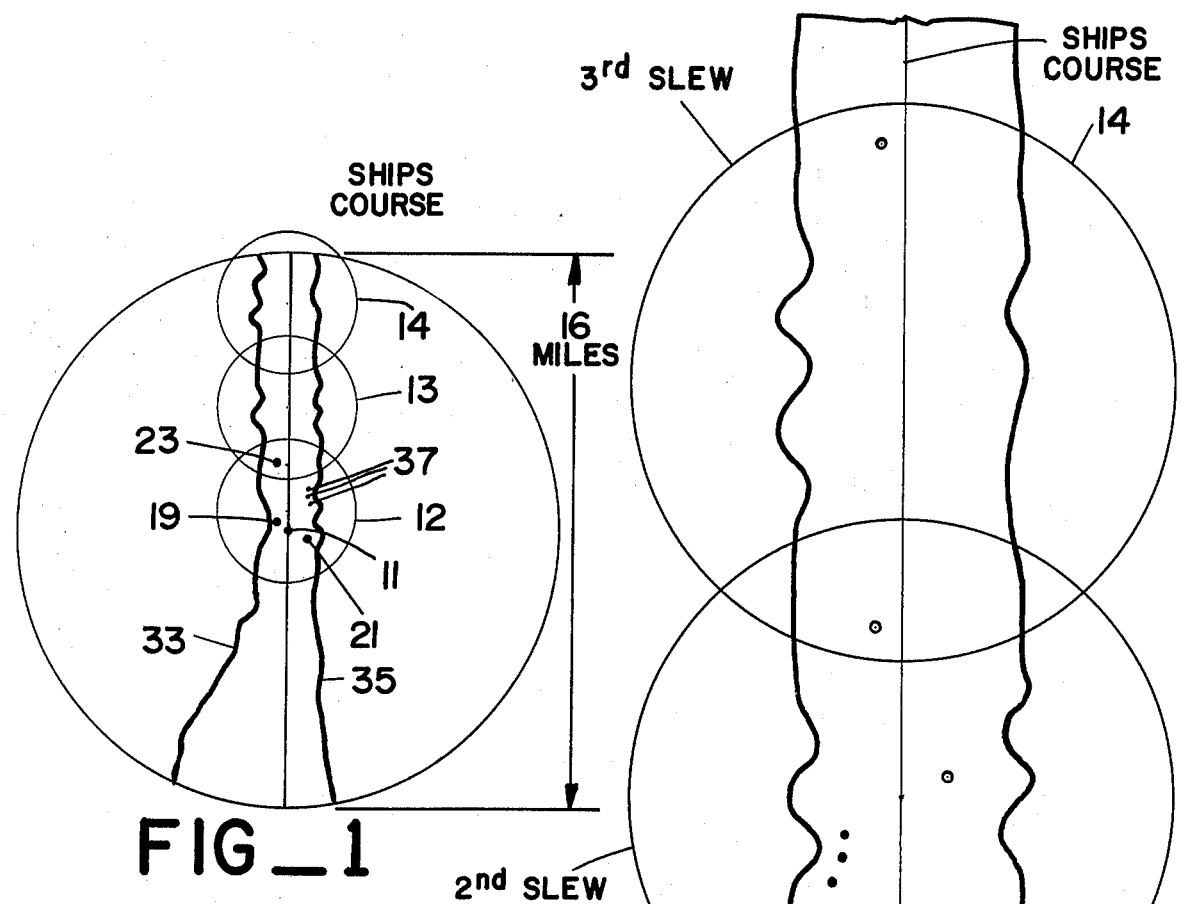
FIG_1
FIG_2
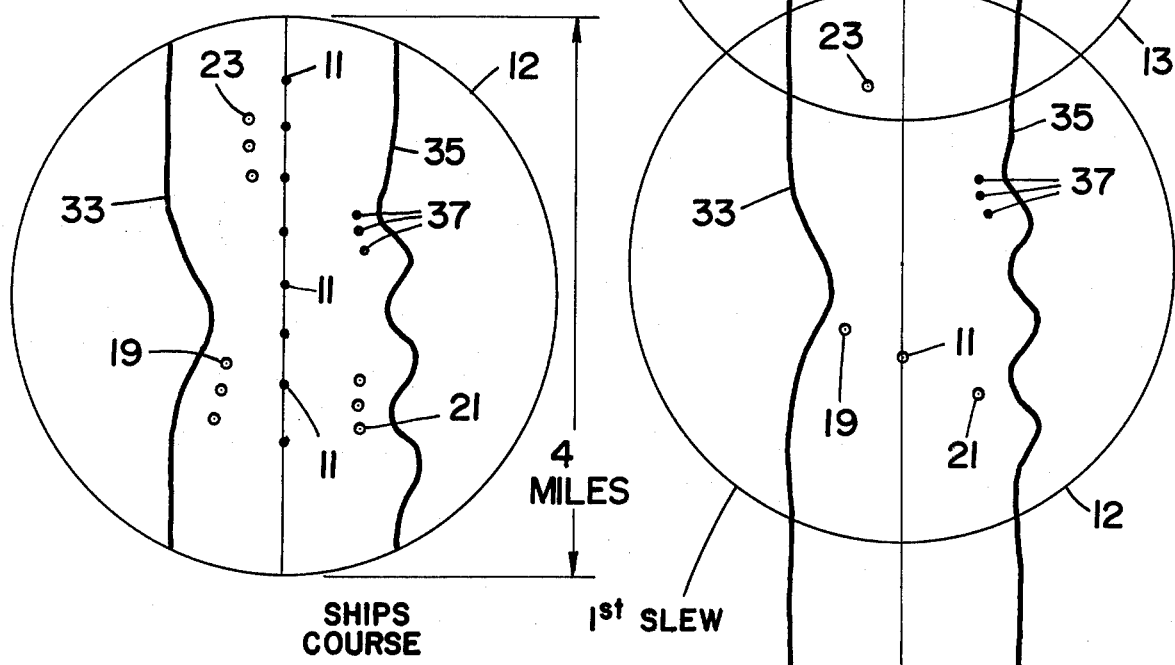
FIG_3

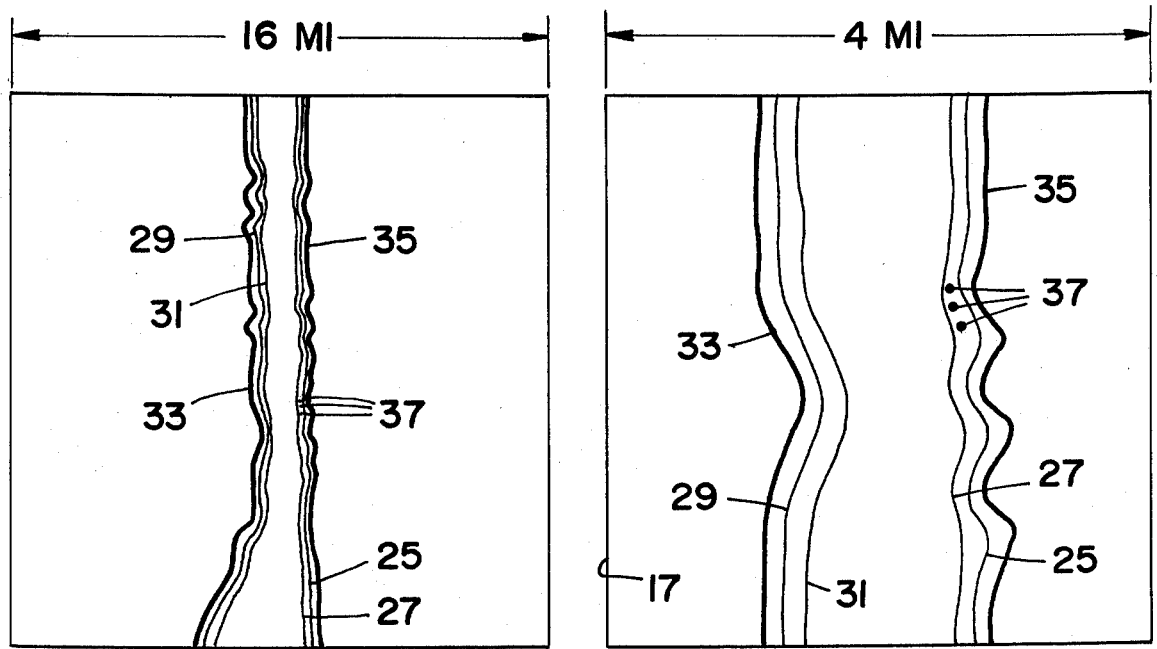
FIG_4  FIG_5
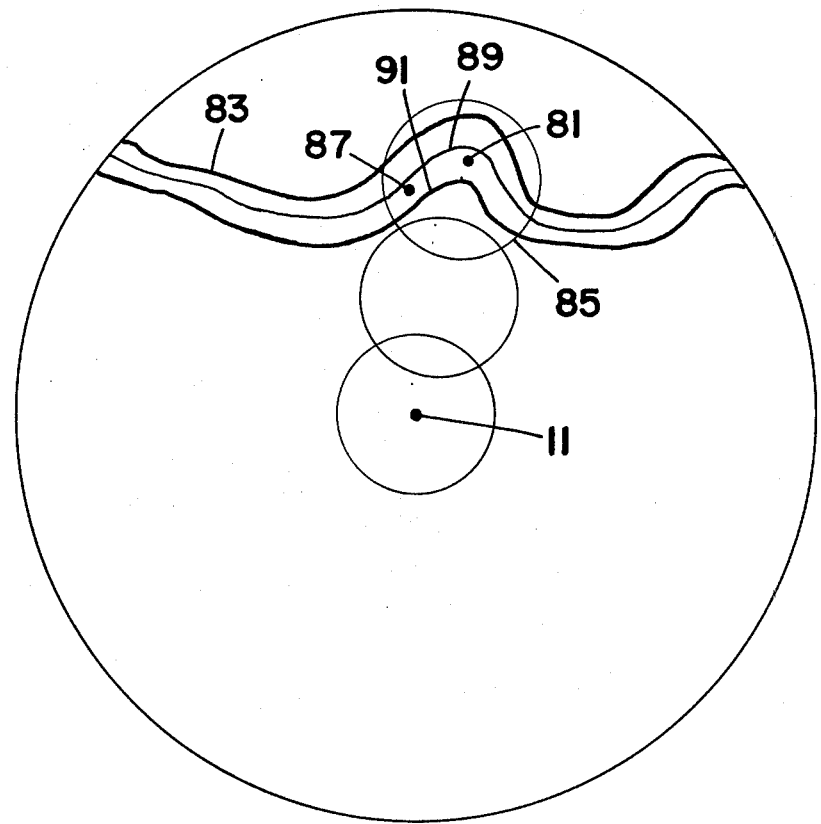
FIG_8

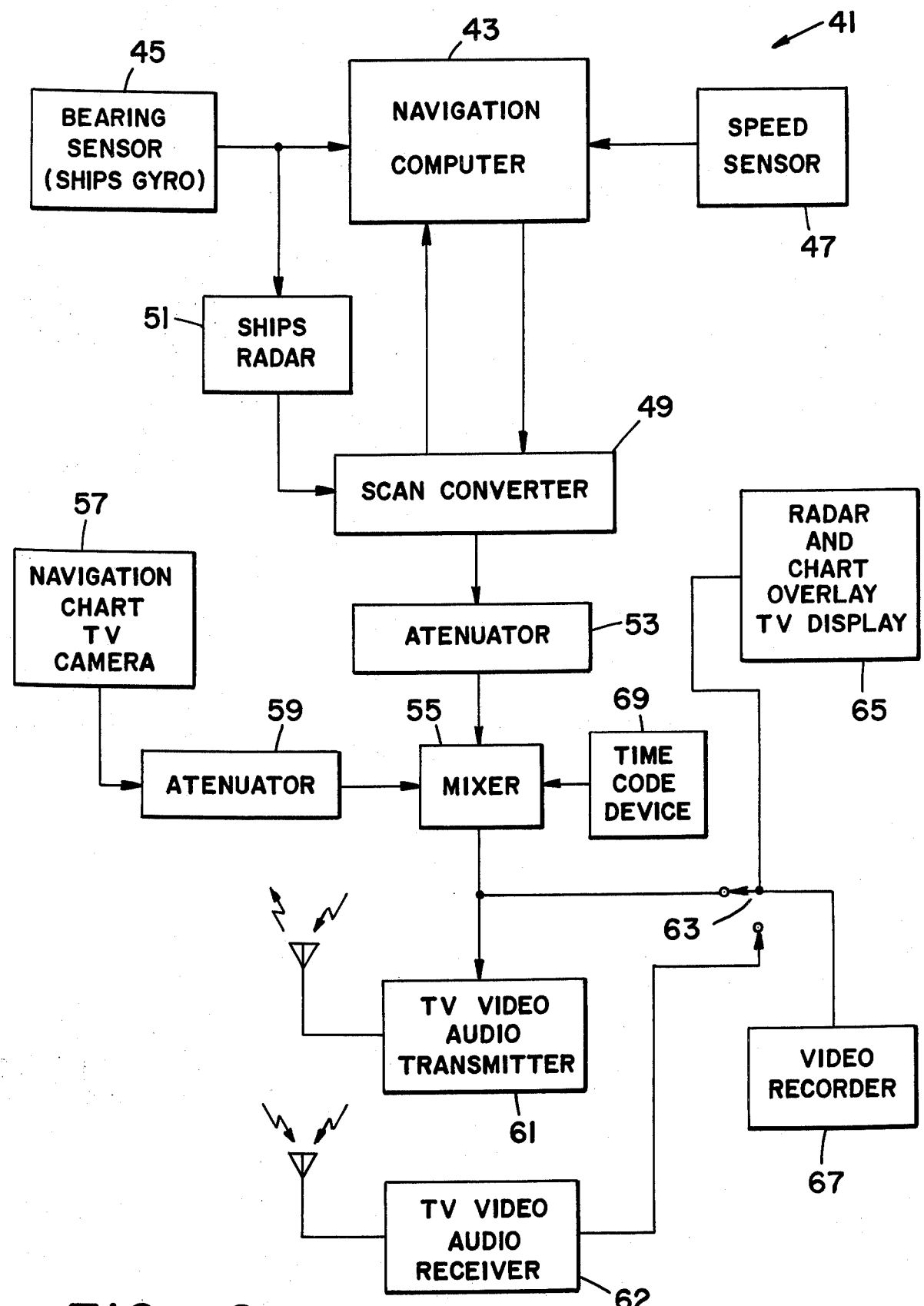
FIG_6

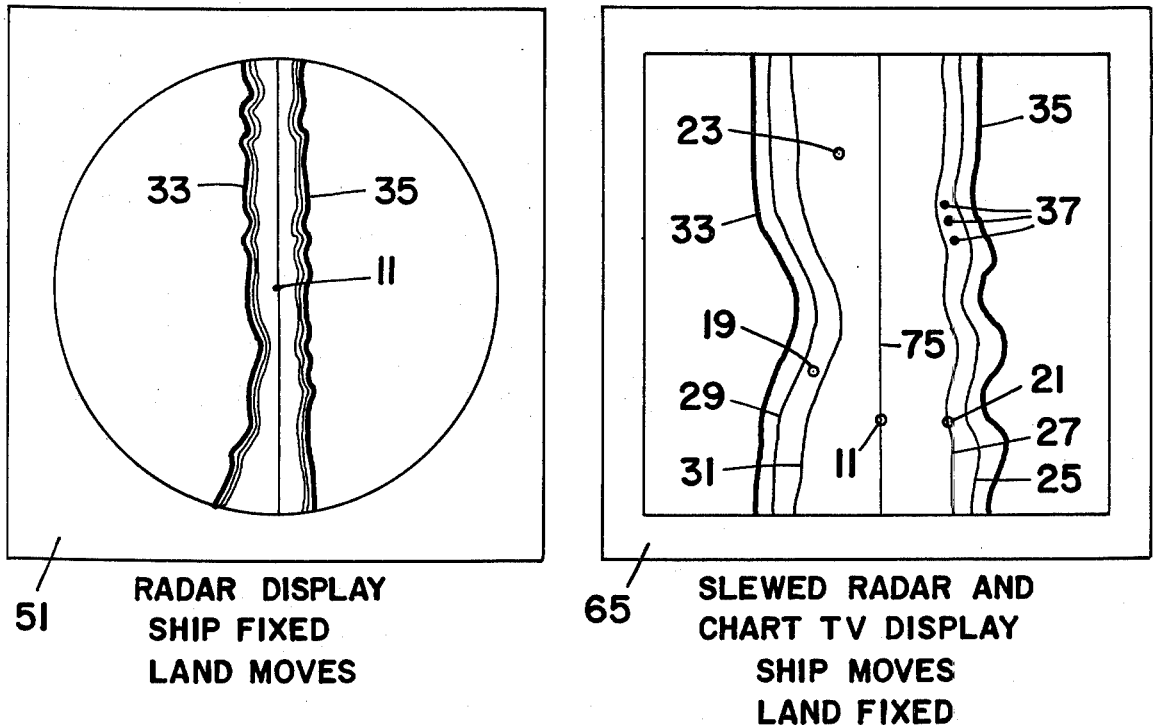
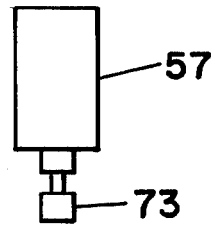
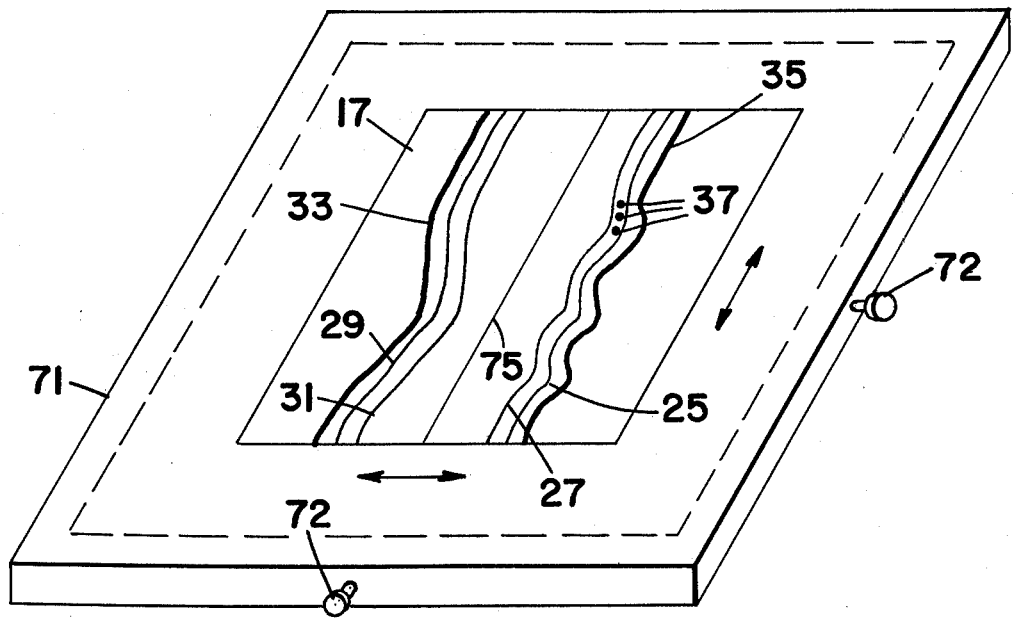
FIG_7

RADAR AND NAVIGATION CHART OVERLAY VIDEO DISPLAY SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present invention relates to a display system and more particularly to a radar and navigation chart real time simultaneous display system.

2. Description of the Prior Art

Normal ship mounted radar displays continuously show the moving ship in the center of the radar display screen and the above surface fixed objects move on the radar display screen with respect to the fixed ship. Therefore, when a ship is cruising near the shore the radar will continuously show the ship in the center of the radar screen and the land terrain will be continuously moving.

For purpose of improved navigation it is desirable to present a radar display wherein the terrain remains fixed and the moving ship is displayed as a moving ship and not stationary in the center of the radar screen. This is achieved by conventional navigational computers that are responsive to the ship's bearing sensor (gyro), the ship's speed sensor, and the ship's radar signal and produces the above described processed slewed radar signal. This provides a useful display but the display does not include much of the information that is included on a navigation chart such as the water depth contours. Therefore, it is necessary for the ship's captain to be in continuous verbal communication with the navigator, who has the navigation charts, regarding the water depth of the planned course as shown by the water depth contours on the navigation maps. This procedure is adequate for many navigation operations. However, in situations where the ship is moving rapidly in coastal or river waters it is not generally adequate since it is very difficult to rapidly communicate the water depth, navigational markers, and the like in the vicinity of the planned course by the navigator to the captain.

The present invention overcomes this problem by continuously displaying on a TV screen both the processed slewed radar information and the navigation chart information for immediate visual use by the ship's captain.

SUMMARY OF THE INVENTION

Briefly, the present invention comprises a display system for simultaneously showing slewed radar and navigation chart information on a real time basis. A slewed radar signal from a ship mounted radar is processed to maintain the terrain as a fixed display and the moving ship, upon which the radar is mounted, as a moving display. A video TV signal is also generated that represents a navigation chart that corresponds to the slewed radar signal. The TV signal representing the processed slewed radar signal is mixed with the navigation chart TV signal and both are simultaneously presented on a TV display. The navigation chart TV signal is adjusted so that the terrain is matched to and is coincident with the terrain of the processed slewed radar signal. The TV display, therefore, presents both slewed radar information and navigation chart information wherein the navigation chart information is fixed on the TV display and all radar presented information that moves with respect to the terrain moves on the TV display.

From this it can be seen that this navigation system is particularly useful during near shore operation of high speed vessels where rapid maneuvering may be required. This is because the skipper has a real time overlay TV display of both the radar presentation and the navigation chart. Without this dual display it is normally necessary for the skipper to be in continuous verbal communication with the navigation room regarding the water depth and other potential hazards that are not shown on the radar display but are shown on the navigation chart.

STATEMENT OF THE OBJECTS OF THE INVENTION

An object of the present invention is to provide an effective radar and navigation chart simultaneous real time display system;

Another object of the present invention is to provide a navigation system that is particularly useful for high speed navigation near shore or river waters;

Still another object of the present invention is to provide a TV display available to the ship's captain that shows the real time position of the ship with respect to the fixed navigation chart information;

Other objects, advantages and novel features of the invention will become apparent from the following detailed description of the invention when considered in conjunction with the accompanying drawings wherein:

BRIEF DESCRIPTION OF THE DRAWINGS

FIG. 1 illustrates a typical radar display from a ship mounted radar and various radar slews;

FIG. 2 is an enlargement of the radar display of FIG. 1 and shows three radar slews;

FIG. 3 is an illustration of a single processed radar slew wherein the terrain is fixed and moving objects are shown in real time;

FIG. 4 is the illustration of a navigation chart that corresponds to the radar display of FIG. 1;

FIG. 5 is the illustration of a navigation chart that corresponds to the radar image of the processed slew of FIG. 3; FIG. 6 is a schematic diagram of the navigation display system of the present invention;

FIG. 7 is a drawing showing the interrelationship of the radar display, the navigation chart, TV camera and the simultaneous display presentation of the present invention;

FIG. 8 illustrates the navigation method of the present invention when used to navigate another vessel.

DESCRIPTION OF THE PREFERRED EMBODIMENT

In FIG. 1 is illustrated a typical radar display from a radar mounted on a vessel 11 that is located in the center of the screen. The diameter of the radar image on the screen is normally either 4, 8, 16 or 32 miles which is determined by the radar scan and control system. For purpose of illustration the radar screen shown in FIG. 1 is selected to be 16 miles. In FIGS. 1 and 2 are illustrated three slews 12, 13 and 14 each of which represents a four mile diameter on the radar display. These slews are achieved by use of a conventional navigation computer in conjunction with the radar wherein the navigation computer selectively provides output signals which will represent any one of these areas identified as slews 12, 13 and 14. It should be noted that slew 12, for example, of FIG. 1 could be enlarged by a factor of 2 by changing the total radar sweep diameter to be 8 miles rather than 16 miles as shown. This would result in improved definition of the radar images on the screen.

It should be particularly noted that the normal radar display will continuously show the moving ship in the center of the radar display screen and the above surface objects such as land will be continuously moving on the radar display screen with respect to the fixed (center of screen) ship.

It should be noted that conventional navigational computers take into account the ship's direction and the ship's speed and provide a radar image output signal that shows the land as being fixed and the ship in motion with respect to the land. This type of presentation can be seen in FIG. 3 wherein the computer output will continuously provide a signal showing slew 12 in a fixed location even though the ship 11 is moving. The computer takes the ship's bearing and speed into account and internally shifts the radar image of the moving ship so that the radar image of the land remains stationary and the radar image of the ship 11 moves on the computer output display as shown in FIG. 3.

In FIGS. 4 and 5 are shown navigation charts 15 and 17. The FIG. 4 chart is 32 miles and represents the same terrain as that shown on the radar image of FIG. 1 and the FIG. 5 chart 17 is 4 miles and represents the same terrain as that shown on slew 12 of FIGS. 1 and 2.

In the past it has been necessary to separately compare the navigation charts of FIGS. 4 and 5 with either the FIG. 1 radar image or the FIG. 2 slewed radar image 12, or the FIG. 3 slewed and computer processed (keeping the land stationary) radar image. It should be particularly noted that both the radar image and the navigation chart information are necessary because they each show essential navigation information that the other does not show. That is, the radar shows other ships such as identified by reference numerals 19, 21 and 23 and the navigation charts will show water depth and location by contour lines 25, 27, 29 and 31 shown in FIG. 5. Normally, both the radar and the navigation chart will show the shore 33 and 35 and bouys 37. The only place on the ship which normally provides visibility of both the radar screen and the navigation charts is in the navigation or chart room. In situations where the ship is moving slowly or is on the high seas it is generally not necessary to have immediate access to both radar and chart information. However, in situations where the ship is moving near to shore and at high speeds it is essential that both the radar and chart information be made available to the person who has immediate control over the ship which is normally the captain or conning officer. The radar and navigation chart simultaneous real time display system of the present invention makes this possible.

In FIG. 6 is a block diagram of the radar and navigation chart simultaneous real time display system 41 of the present invention. System 41 includes a navigation computer 43 that receives inputs from the ship mounted bearing sensor 45 (normally the ship's gyro), the ship mounted speed sensor 47 and the scan converter 49. The output of the bearing sensor 45 is also applied to the ship mounted radar 51 to assure that it is always properly oriented so that North is normally on the top of the radar screen. The output of scan converter 49 is applied through attenuator 53 to one input of mixer 55. The output of navigation chart TV camera 57 is applied through attenuator 59 to another input of mixer 55. The output of time code device 69 is also applied to an input of the mixer to indicate the time and date. The output of mixer 55 is applied to TV video and audio transmitter 61 and through selector switch 63 to radar and chart overlay TV display 65 and video recorder 67. When switch 63 is in the other position then the signal received by TV video audio receiver 61 is applied to the inputs of chart and radar TV display 65 and video recorder 67. It should be noted that various other types of information may be switched onto the system and shown on display 65.

OPERATION

In FIG. 7 is schematically illustrated the overall system operation. The ship's radar 51 is shown as having a display that is the same as in FIG. 1. The chart shown on chart table 71 is the same as the chart 17 shown in FIG. 5. The composite TV picture of the slewed radar and chart are shown on slewed radar and chart TV display 65 is the combination of the output of scan converter 49 which is a TV signal representing radar slew 12 of FIG. 2 and the output of TV camera 57 which is a TV signal representing the navigation chart 17 of FIG. 5.

The output of TV camera 57 is initially attenuated by attenuator 59 and the output of scan converter 49 is presented on display 65. This is a processed slewed radar signal and is selected to represent slew 12 of FIGS. 1 and 2. As previously explained this slewed radar image 12, as processed by conventional navigation computer 43 and scan converter 49, will retain the land fixed and the real time position of the ship and other moving targets will be presented as shown and described with respect to FIG. 3. From this it can be seen that the radar image of the shores 33 and 35 and bouys 37 will remain fixed and ship 11 and targets 19, 21 and 23 will be moving and shown on a real time basis. However, without the information on chart 17 being also presented on display 65, information concerning water depth as shown by contours 25, 27, 29 and 31 are not known since the radar does not have the capability of providing this type of information. Therefore, after the desired slew 12 is presented on display 65 then the output of TV camera 57 is also presented on display 65. Then the image size is adjusted by adjusting size selector 73 of TV camera 57 and the position of the chart 17 is moved so that the shore contours of the slewed radar display correspond with the shore contours of the chart. This movement of the chart 17 may be achieved by hand sliding the chart on the surface of the table or by moving the table by means of vertical and horizontal knobs 72 or by manually slewing the camera to show a different part of the chart. When this is accomplished then the depth contour 25, 27, 29 and 31 are also displayed on display 65. Therefore, a real time single TV display is presented of a combination of the slewed radar signal (with the land fixed and the ship and targets moving) and the corresponding navigation chart. This dual display may now be readily presented on several TV screens on the ship and is especially useful on the bridge so that the captain can see this continuously displayed information. This is especially useful when the ship is traveling rapidly along coastal waters so that rapid maneuvers can be made and still avoid both shallow waters and above surface targets and obstacles.

Referring to FIG. 7, it should be noted that the navigator may plot the ship's course 75 on navigation chart 17 (or on a transparent overlay) which will be displayed on display 65. Therefore, the ship may be steered by the captain so that the radar image of the ship 11 stays on course 75 which is shown on the TV display that he is watching.

The system also has the capability of transmitting by transmitter 61 the display information to other ships and to receive similar type of information from other ships in the vicinity. This is particularly useful when security prevents certain ships from transmitting with their radar. In these situations a more distant ship, which does not have these security limitations, may transmit to the receiving ship video information showing the maneuvering ship (being kept secure), target ships and all other stationary obstacles and all navigation chart information in its vicinity of operation.

In FIG. 8 is illustrated the navigation method of the present invention when used for navigation of a vehicle that has no radar or navigation charts or cannot transmit with its radar for reasons of security. A vessel 11 has a navigation system 41 of the type shown in FIG. 6. Vessel 81 is near shore and has available for use a TV receiver that may receive and display TV signals transmitted from vessel 11. Vessel 11 is further from shore 83 than vessel 81 and is in a position where it can transmit both radar and TV signals. In accordance with the navigation method of the present invention the radar 51 of FIG. 6 on vessel 11 is selected to have a range, such as 32 miles diameter, that includes the region of operation of vessel 81. As previously explained with respect to FIG. 6, the navigation system is selected to process slew 85 and to transmit by transmitter 61 the output of mixer 55 to vessel 81. The output of mixer 55 is a mixed TV signal that includes both the slewed and conditioned radar signal of slew 85 and the navigation chart that corresponds to slew 85. Therefore, the TV display on vessel 81 covers the area in slew 85 and shows all fixed objects, such as the above surface terrain, as well as the below surface terrain, such as depth contours 89 and 91, obtained from the navigation chart. In addition the TV display will show all moving objects, such as its own vessel 81 or another target vessel 87. Alternatively, the signal transmitted to vessel 81 may be the entire radar sweep and a corresponding navigation chart. This navigation system therefore makes it possible to navigate ship 81 (without transmitting any information from ship 81) by having only a TV receiver on ship 81 for receiving the combined TV signal transmitted from ship 11.

What is claimed is:

1. A navigation system comprising:
   (a) a radar for providing a radar output signal from a moving vehicle;
   (b) first means for slewing said radar signal and providing a slewed radar signal defining a first region;
   (c) second means responsive to the vehicle direction and vehicle speed for conditioning said slewed radar signal to provide a slewed and conditioned radar signal wherein the terrain remains fixed and the vehicle moves with respect to the fixed terrain;
   (d) third means for converting said slewed and conditioned radar signal into a slewed and conditioned TV signal;
   (e) fourth means for generating a chart TV signal defining a navigation chart of said first region, said fourth means including a scaling means for adjusting the image size of said navigation chart to correspond with the image size of said first region defined by said slewed and conditioned TV signal;
   (f) fifth means for simultaneously combining and superimposing for displaying said slewed and conditioned TV signal defining said first region and said chart TV signal defining said first region; and
   (g) sixth means for displaying the output of said fifth means.

2. A navigation system comprising:
   (a) a radar, a bearing sensor, a speed sensor, a navigation computer, a scanconverter, a navigation chart TV camera including scaling means for adjusting the image size of a navigation chart, a mixer and a TV display;
   (b) the output of said bearing sensor and the output of said speed sensor and one output of said scanconverter connected to the input of said navigation computer;
   (c) the output of said bearing sensor connected to the input of said radar and the output of said radar connected to the input of said scanconverter;
   (d) the output of said navigation computer connected to the input of said scanconverter, the output of said scanconverter connected to one input of said mixer, the output signal from said navigation chart TV camera connected to the other input of said mixer;
   (e) the output signal of said mixer connected to the input of said TV display; wherein
   (f) said output signal from said scanconverter is a slewed and conditioned TV signal defining a first region and said scaling means of said navigation chart TV camera being adjusted to provide a navigation chart TV signal wherein the image size of said navigation chart TV signal corresponds with the image size of said slewed and conditioned TV signal defining said first region and the output signal from said mixer is a combined TV signal superimposing said slewed and conditioned TV signal defining said first region and said navigation chart TV signal defining said first region.

3. The method of navigating a first vehicle comprising the steps of:
   (a) generating a slewed and conditioned radar signal from said first vehicle of a first region that defines fixed objects in said first region as being fixed and moving objects as moving on a real time basis with respect to said fixed objects and said first vehicle being located within said first region;
   (b) converting said slewed and conditioned radar signal into an equivalent slewed and conditioned TV signal;
   (c) generating a chart TV signal defining a navigation chart of said first region by adjusting the image size of said chart TV signal to correspond with the image size of said slewed and conditioned TV signal defining said first region; and
   (d) simultaneously superimposing and displaying said slewed and conditioned TV signal defining said first region and said chart TV signal defining said first region on a TV display and navigating said first vehicle by viewing said TV display.

4. The method of claim 3 further including:
   (a) marking a vehicle course on said chart defining said first region; and
   (b) navigating said first vehicle so that the moving image of said moving vehicle on said TV display follows and remains on said marking of said vehicle course displayed on said TV display.

5. The method of claim 3 further including:
(a) generating said chart TV signal defining said navigation chart of said first region from a navigation chart of a second region wherein said second region is larger than and includes said first region.

6. The method of claim 5 further including:
(a) said first vehicle being in about the center of said second region, a third region within said second region and said third region including a second vehicle but not said first vehicle;
(b) transmitting from said first vehicle to said second vehicle a combined signal including a slewed and conditioned TV signal defining said third region and said chart TV signal defining said third region; and
(c) a TV display on said second vehicle that receives and displays said combined signal and navigating said second vehicle by viewing said display.

7. A navigation system comprising:
(a) a radar for providing a radar output signal from a moving vehicle;
(b) first means for slewing said radar signal and providing a slewed radar signal defining a first region;
(c) second means responsive to the vehicle direction and vehicle speed for conditioning said slewed radar signal to provide a slewed and conditioned radar signal wherein the terrain remains fixed and the vehicle moves with respect to the fixed terrain;
(d) third means for converting said slewed and conditioned radar signal into a slewed and conditioned TV signal;
(e) fourth means for generating a chart TV signal defining a navigation chart of said first region;
(f) fifth means for simultaneously combining and superimposing for displaying said slewed and conditioned TV signal defining said first region and said chart TV signal defining said first region;
(g) sixth means for displaying the output of said fifth means;
(h) a transmitter for transmitting said slewed and conditioned TV signal and said chart signal;
(i) a receiver for receiving combined slewed and conditioned TV signals and chart signals; and
(j) switching means for selectively switching either said signals from said fifth means to said sixth means or switching said receiver to said sixth means.

8. A navigation system comprising:
(a) a radar, a bearing sensor, a speed sensor, a navigation computer, a scanconverter, a navigation chart TV camera, a mixer and a TV display;
(b) the output of said bearing sensor and the output of said speed sensor and one output of said scanconverter connected to the input of said navigation computer;
(c) the output of said bearing sensor connected to the input of said radar and the output of said radar connected to the input of said scanconverter;
(d) the output of said navigation computer connected to the input of said scanconverter, the output of said scanconverter connected to one input of said mixer, the output signal from said navigation chart TV camera connected to the other input of said mixer;
(e) the output signal of said mixer connected to the input of said TV display;
(f) said output signal from said scanconverter is a slewed and conditioned TV signal defining a first region and said output signal from said navigation chart and TV camera is a TV signal defining said first region and the output signal from said mixer is a combined TV signal superimposing said slewed and conditioned TV signal defining said first region and said navigation chart TV signal defining said first region;
(g) a transmitter for transmitting the output from said mixer;
(h) a receiver for receiving combined slewed and conditioned TV signals and navigation chart signals; and
(i) switching means for selectively switching either said output signal from said mixer to said TV display or switching the output signal from said receiver to said TV display.

* * * * *

UNITED STATES PATENT OFFICE
CERTIFICATE OF CORRECTION

PATENT NO. : 4,081,802
DATED : March 28, 1978
INVENTOR(S) : Richard E. Elmore and Richard L. Plumb It is certified that error appears in the above-identified patent and that said Letters Patent are hereby corrected as shown below:

"[73] Assignee: The United States of America as represented by the Secretary of the Navy, Washington, D.C."

should be deleted.

Signed and Sealed this

Fifth Day of June 1979

[SEAL]

Attest:

RUTH C. MASON
Attesting Officer

DONALD W. BANNER
Commissioner of Patents and Trademarks